Feb. 9, 1954  J. WEISS ET AL  2,668,608
BRAKE CONTROL SYSTEM FOR MOTOR VEHICLES
Filed Jan. 22, 1948  3 Sheets-Sheet 1

INVENTORS
Joseph Weiss and Abraham Weiss
ATTORNEY

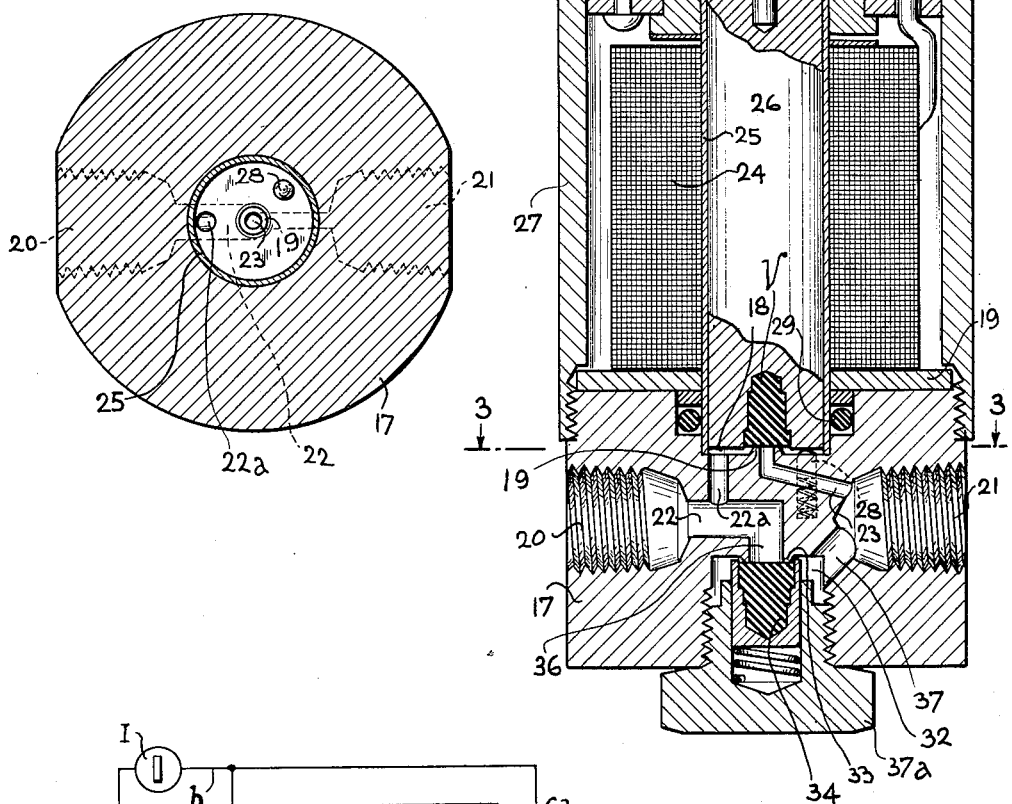
FIG. 2.
FIG. 3.
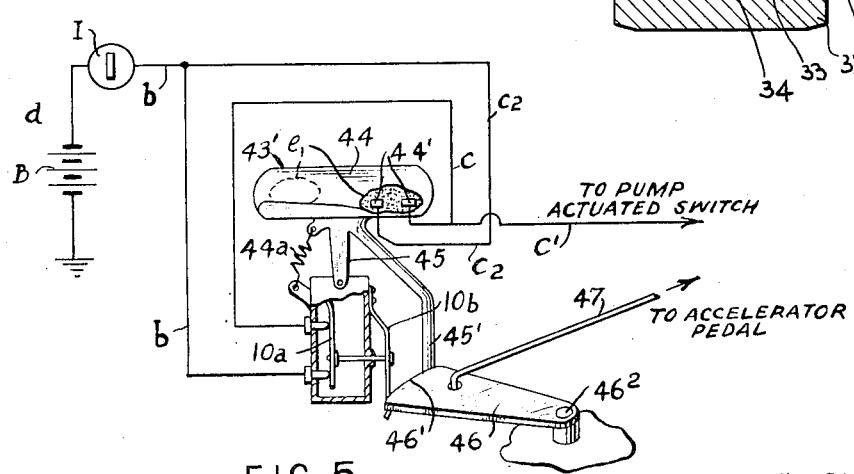
FIG. 5.
INVENTORS.
Joseph Weiss and Abraham Weiss
ATTORNEY.

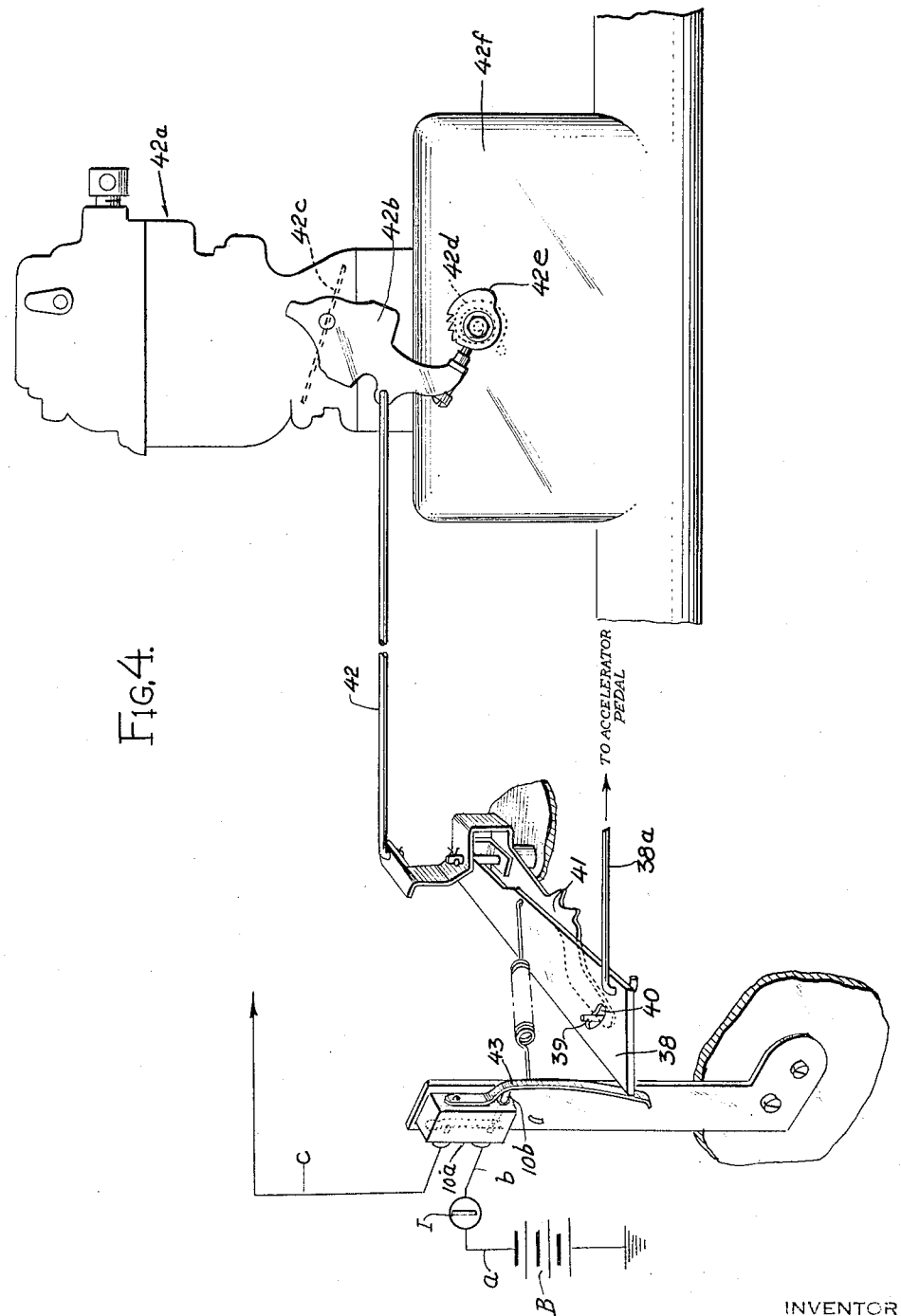

Patented Feb. 9, 1954

2,668,608

UNITED STATES PATENT OFFICE 2,668,608

BRAKE CONTROL SYSTEM FOR MOTOR VEHICLES

Joseph Weiss and Abraham Weiss, New York, N. Y.; said Joseph Weiss, administrator of said Abraham Weiss, deceased, assignor to Joseph Weiss, individually Application January 22, 1948, Serial No. 3,736

12 Claims. (Cl. 192—3)

This application is a continuation-in-part of our applications Serial #715,580, filed December 11, 1946, now Patent No. 2,630,195, dated March 3, 1953, and Serial #762,590, filed July 11, 1947, now Patent No. 2,630,196, dated March 3, 1953.

The invention relates to a brake control system for motor vehicles, and has as its principal object to provide means for causing the automatic locking of the brakes when the vehicle is brought to a full stop, while the ignition is on, and the accelerator released.

Another object is to provide a pressure and vacuum responsive governor adapted to control said brake locking means so as to automatically cause the unlocking thereof when the vehicle is moved either forward or in the reverse.

Still another object is to provide means whereby the unlocking of the brakes will be automatically delayed until after the engine has been started.

Still another object is to provide means whereby, when the vehicle is stopped on a steep upgrade, the unlocking of the brakes will be automatically delayed until after the engine has developed sufficient torque to move the vehicle.

And still another object is to provide manual means whereby when the vehicle is stopped, with the ignition on and the accelerator released, the brakes may be caused to be locked and maintained locked until released by the depression of the accelerator.

And still another object is to provide both manual means and transmission actuated means whereby when the vehicle is stopped with ignition on, accelerator released and transmission in neutral, the brakes may be caused to be locked and maintained locked after the depression of the accelerator until released by the manual means.

With these and other objects in view which will be apparent from the detailed description of our invention, the latter consists in the novel arrangement, combination and construction of parts as will be hereinafter more fully described and defined in the appended claims.

In the accompanying drawings, which constitute part of this specification, and in which similar reference numerals denote corresponding parts:

Fig. 1 is a diagrammatic view of one embodiment of our invention;

Fig. 2 an enlarged sectional elevation of the solenoid actuated valve for controlling the fluid pressure;

Fig. 3 is a cross section on line 3—3 of Fig. 2;

Fig. 4 is a perspective view of an electric switch actuated by the accelerator and an elevation view of carburetor including thermostatic element and throttle valve, associated with the switch; and Fig. 5 is a diagrammatic view of a combination of the accelerator actuated switch and a mercury switch.

Figure 1:
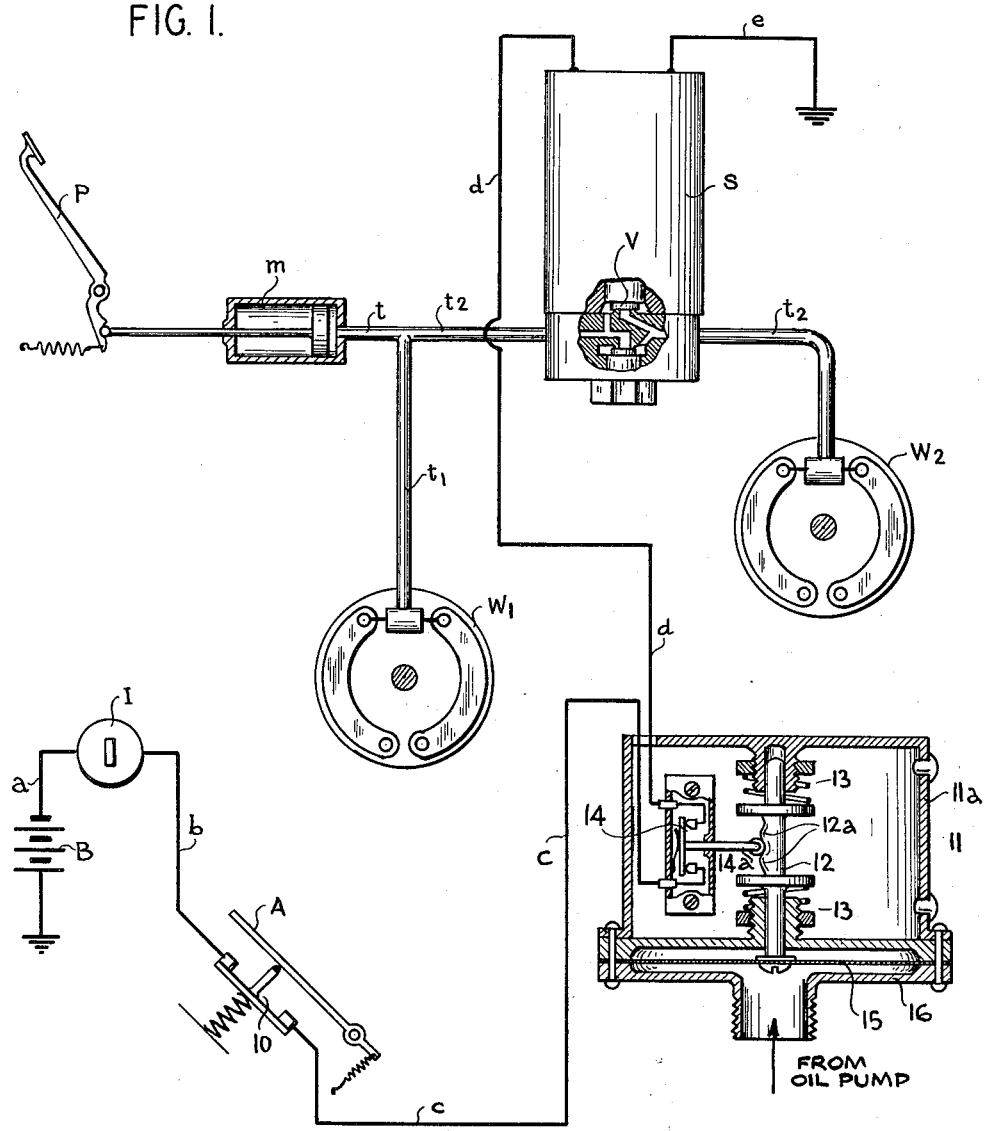

Referring to the embodiment shown in Fig. 1, the brake pedal P is operatively connected to the plunger movable in the master fluid cylinder M which through conduits $t$, $t^1$ and $t^2$ communicates with the brake fluid cylinders of wheels $W1$, $W2$ of the motor vehicle (not shown). As in our earlier applications, the conduit $t^2$ leading into the brake fluid cylinders of wheels $W2$ is controlled by a valve V adapted to be actuated electrically by means of a solenoid S, while the conduit $t^1$ leads directly from the master cylinder M into the fluid cylinders of wheels $W1$ whose brakes are not affected by the electric means. B denotes the battery, I the ignition switch, A the accelerator pedal and 10 an electric switch adapted to be closed when the accelerator is released and to be opened when actuated for fuel feeding. Included in the battery circuit is a hydraulic governor 11 adapted to be automatically actuated from the oil pump of the transmission or the like, which oil pump is positively operated by a conventional propeller shaft (not shown). Said transmission is connected to at least one of the wheels of the vehicle, such as a wheel associated with brake $W1$, which wheel, when in motion, actuates the oil pump through the transmission and, when the wheel is at rest, the oil pump is inoperative. Said governor 11 comprises a closed casing 11ª in which is movably mounted a rigid member 12 provided with a pair of adjacent cams 12ª arranged longitudinally relative to the movement of said member. 13 denotes suitable adjustment means for said member 12. Mounted opposite said movable member is an electric switch 14, adapted to be actuated by said movable member 12 through projection 14ª, which in switch closing position is adapted to bear in a depression between said pair of cams 12ª. When the member is moved from its neutral position in one or the other direction, as will be presently described, said projection 14ª will be caused to ride up one or the other of its cams 12ª and thereby open the switch 14.

One end of member 12 is attached to a membrane or diaphragm 15, or other suitable means, such as bellows, provided outside said casing 11ª and forms the top of a receptacle 16 fixed to said casing and adapted to communicate with an oil pump (not shown) or other hydraulic means.

In the present embodiment, the solenoid actuated valve, which in practice has been found to give satisfactory results is constructed as follows:

Adapted to be interposed between opposite sections of the conduit $t^2$ (see Fig. 1) is a channelled body 17 having a cavity 18 and valve seat 19. 20 denotes an inlet passage to be connected to the section of conduit $t^2$ leading from the master cylinder m and an outlet passage 21 to be connected to a second section of conduit $t^2$ leading into the fluid cylinders of brakes of wheels W2. Passage 20 terminates in port 22, which by port 22a leads into the cavity 18. 23 is a port leading from cavity 18 into the outlet passage 21. The solenoid S is mounted above the seat 19 of the body 17. It comprises the electric coil 24 wound around the tubular core 25 in which is longitudinally movable the armature 26, in whose end opposite and centrally relative the seat 19 is fixed the valve body V of rubber or other suitable material. 27 denotes a casing enclosing the coil and threaded or otherwise removably fixed to the body 17. 28 denotes a spring finger adapted to normally, i. e., when the solenoid is deenergized, hold the valve body V off its seat 19. 29 denotes suitable packings around the core of the solenoid coil to prevent fluid from leaking. 30, 31 are the terminals of the solenoid.

Provided in the body 17 is a second cavity 32 and seat 33 for an auxiliary valve body 34. This valve is adapted, by spring action, to be normally closed, and to control the flow of the pressure fluid from inlet passage 20 into outlet passage 21 through ports 36, 37, but prevents the return flow thereof. The valve body 34 is advantageously mounted in a plug 37a which threads into the cavity 32.

The operation is as follows:

When the vehicle is at a standstill, the oil pump too will become inactive, so that the member 12 will occupy the neutral position shown, and the electric switch 14 held closed. With the ignition on and accelerator switch 10 closed, the electric circuit energizing the solenoid S will be completed through lines a, b, c, switch 14, line d to the solenoid S and thence through line e to ground. As a result thereof, on the depression of the brake pedal P, pressure on the brakes of wheels W1, W2, will be applied, and the brakes of wheel W2 become locked, and stay locked even after the release of the brake pedal.

Upon the release of the brake pedal either fully or partly, the brakes of the wheels W1 will be released, and, upon operation of the accelerator pedal A, switch 10 opens the electric circuit for the solenoid S, and the brakes of wheel W2 will also be released, which will permit the vehicle to be moved either forwardly or in the reverse. Upon such movement of the vehicle, the hydraulic pump will again become active, and either through pressure during forward motion or suction during reverse, cause the diaphragm 15 to move in either direction from normal position, as the case may be, thereby displacing the member 12 from its normal position, and causing one or the other of its cams 12a, according to the direction of movement of said member 12, to open the switch 14 with the result that the solenoid circuit will be open at another point, thereby preventing the brakes of wheels W2 from locking even though the acelerator A is released and switch 10 closed.

It is necessary, especially in cold weather, to prevent the opening of accelerator switch 10a and, therefore, the unlocking of the brakes by the usual thermostatically and/or the automatic controlled throttle of the carburetor which moves the accelerator throttle to speed up the engine during the starting or warming up period. The automatic movement of the throttle during this period will open switch 10a, which is ordinarily set to open on a slight movement of the accelerator throttle by the operator. To accomplish this, we provide the modification shown in Fig. 4, in which there are means which are under the control of the carburetor throttle and are so operatively connected to the accelerator, that the opening of the accelerator actuated switch 10a will be delayed until the engine has sufficiently warmed up. The switch 10a, of any suitable construction, is adapted to be actuated from the accelerator through a spring actuated pivoted lever 38, which by rod 38a is connected to accelerator pedal A (Fig. 1) and adapted to hold the spring-urged switch 10a closed when the accelerator is released. This lever 38 has a pin and slot connection 39, 40, with a second lever 41 swinging around the same axis as lever 38 and suitably associated by rod 42 with the carburetor 42a. Specifically, the rod 42 is connected at the carburetor to a pivotally mounted throttle lever 42b carrying a butterfly throttle 42c therewith under control of a thermostatic element 42d coupled to a fast idle cam 42e pivotally mounted on a manifold heat jacket 42f. The operation of the above parts is conventional and well known in the automotive art. The electric means shown in Fig. 1 are the same in this modification.

Normally, i. e., when the accelerator is released, the pin 39 in slot 40 occupies a central or neutral position. On starting the engine, the thermostatically controlled throttle 42c of the carburetor 42a will open a certain amount, causing the engine to speed up until it has sufficiently warmed up to be prevented from stalling. The rod 42 under the action of the throttle lever 42b will be caused to swing lever 41 until its pin 39 bears against one edge of the slot 40. Now, on the depression of the accelerator, the levers 38 and 41 will be moved together, releasing spring 43 which normally presses against a projection 10b of switch 10a, holding it closed. The opening of switch 10a, as in Fig. 1, will cause the breaking of the circuit through the solenoid and thereby unlock the brakes. It is, of course, understood that any equivalent fast idle throttle control arrangement may be used without departing from the scope of the invention.

It may be desired or necessary when the car is on a steep upgrade to accelerate the engine so that sufficient torque will be developed to move the vehicle before the brake is released. To accomplish this, we provide the means shown in Fig. 5. There we employ a switch actuated by level seeking means. In the example shown 43¹ denotes a mercury actuated switch, in which the spring-urged mercury container 44 is pivotally supported by arm 45 on a stationary part such as the housing of switch 10a. Arm 45 has an extension 45¹ which is adapted to extend toward and normally bear against a cam 46¹ provided on a lever 46, pivoted at 46² to a stationary part and adapted to be actuated from the accelerator by rod 47 or the like. The lever 46, like lever 38, in the preceding modification, when the accelerator is released, is adapted to hold the switch 10a closed. The cam edge 46¹ of lever 46 will hold the container 44 against its spring 44a until after the switch 10ª has been opened. On further depression of the accelerator to speed up the engine, the cam 46¹ will release the container 44, permitting it to swing into normal position, thereby causing the mercury to open switch 43¹.

The operation is as follows:

When the vehicle travels on level ground or downgrade, the container 44 by its spring 44ª will be held in a position in which the mercury $l$ will be out of contact with the contact pieces 44¹, the extension 45¹ of the arm 45 bearing against the cam edge 46¹ of lever 46.

When the vehicle happens to travel on an upgrade, the mercury $l$ will close switch contact pieces 44¹ so that when the vehicle is stopped on the upgrade by the application of the brakes, as heretofore described, the swinging of lever 46 in the direction indicated by arrow by the release of the accelerator and the consequent opening of switch 10ª, will retard the release of the extension 45¹ thereby preventing the mercury container to be pulled by its spring into normal position, in which the mercury will open the switch contact pieces 44¹. The greater the upgrade the longer can the mercury switch remain closed to permit the engine to develop the necessary power to move the vehicle.

When the accelerator switch 10ª is opened, while the mercury switch 43¹ is closed, the circuit energizing the solenoid S will be completed through lines $a, b, c^2, c^1$ to closed hydraulic switch 14 (Fig. 1) and thence through line $d$ to solenoid. When mercury switch 43¹ is open and the switch 10ª closed, the circuit will be completed through lines $a, b, c, c^1$ to switch 14 (Fig. 1), etc. The mercury switch may be used without switch 10ª, so as not to have the brake holding means function when the vehicle is either on downgrade or level road or both. In some cases this may be desired.

Various other changes may be made in the construction of our device without departing from the principle of our invention, and we do not, therefore, restrict ourselves to the details described and shown herein.

What we claim is:

1. Brake control system for a motor vehicle having fluid pressure actuated brakes, said system comprising fluid pressure control means for automatically affecting at least one of said brakes including a valve mechanism, electric means for actuating said valve mechanism including a solenoid, a wheel in said vehicle not affected by said one of said brakes, a governor capable of affecting said electric means and adapted to be actuated from said wheel, said governor including an electric switch controlled thereby, and an accelerator actuated switch adapted to be closed when the accelerator is released and opened when the latter is depressed.

2. In brake control means according to claim 1, in which said governor comprises means responsive to pressure and suction, a displaceable member connected to the latter means, and means operated by said member to hold said first named switch closed when said member is in neutral position and open when displaced from neutral.

3. In a brake control system according to claim 2, in which the displacement of said member is adjustable.

4. In a brake control means, according to claim 1, in which said electric means includes a level seeking device and a switch controlled from the latter, so that when the vehicle is on an upgrade, said switch will close, means for normally urging said device into neutral position and means controlled from the accelerator and associated with said device so that said switch will remain closed after the opening of the accelerator switch, until said device is released by the action of the accelerator and can return into switch opening position.

5. In brake control system according to claim 1 in which said valve mechanism comprises a channelled body and two valve bodies, one being adapted to be normally open and to be closed by said solenoid, when the latter is energized, and the other valve being adapted to be normally closed and to open under fluid pressure acting only in one direction but not in opposite direction.

6. In brake control means according to claim 1, in which said electric means includes a level seeking device and a switch controlled from the latter so that when the vehicle is on a level or an upgrade said switch will close, means for normally urging said device into a neutral position, and means controlled from the accelerator and associated with said device so that said last named switch will remain closed until said device is released by the action of the accelerator and can return to switch opening position.

7. Brake control system for a motor vehicle having fluid pressure actuated brakes, said system comprising a solenoid-operated valve mechanism for automatically causing the locking of at least one of the brakes, electric means including an electric circuit and switches in said circuit for controlling the locking operation of said valve mechanism, one of the switches in said circuit being accelerator actuated and adapted normally to maintain a closed circuit condition when unactuated, a wheel in said vehicle not affected by said one of said brakes, a governor adapted to be driven from said wheel of the vehicle which is not affected by the locking operation of the valve mechanism on the brakes, and a second switch in said circuit also normally closed and adapted to be operated by the governor and opened whenever the governor is driven to deenergize the solenoid of the valve mechanism and unlock the brakes independently of any actuation of the accelerator actuated switch.

8. Brake control system for a motor vehicle having fluid-pressure actuated brakes, said system comprising fluid pressure control means for automatically causing the locking of at least one of said brakes when the vehicle is stopped and including a valve mechanism, electric means for actuating said valve mechanism and including a solenoid, a wheel in said vehicle not affected by said one of said brakes, a governor adapted to be actuated from said wheel of the vehicle which is independent of the locking of said brakes, an electric switch controlled by actuation of said governor so as to be closed when the vehicle is at rest and opened by the governor when the vehicle is moved, and an accelerator switch adapted to be closed when the accelerator is released and opened when the accelerator is actuated.

9. In a motor vehicle having fluid pressure actuated brakes, an accelerator, an accelerator-operated switch, control means for automatically affecting at least one of the brakes including a valve mechanism and electric means for actuating said valve mechanism, a wheel in said vehicle not affected by said one of said brakes, a governor capable of affecting said electric means and adapted to be actuated from said wheel of the vehicle which is not affected by the operation of said valve mechanism on said brakes, said governor comprising an electric switch, means responsive to pressure and suction, a displaceable member connected to the last-named means, and means operated by said member to hold the last-named switch closed when said member is in a neutral position and open when displaced from the neutral position.

10. In a motor vehicle having an accelerator, a carburetor, a throttle valve, and thermostatic means for controlling said throttle valve, a switch adapted to be actuated by the accelerator, an accelerator linkage interconnecting said accelerator and said accelerator switch, a carburetor linkage connecting said carburetor to said accelerator linkage, and means in said carburetor linkage for permitting free movement of the carburetor linkage by the thermostatic means without affecting said accelerator switch, whereby idling speed of said vehicle is controlled.

11. The combination with a motor vehicle, provided with an accelerator, a carburetor, a carburetor throttle actuated by said accelerator and an auxiliary actuating means whereby said throttle can be actuated independently of said accelerator, of a switch adapted to be actuated by the accelerator, an accelerator linkage interconnecting said accelerator and said accelerator switch, a carburetor linkage connecting said carburetor to said accelerator linkage, and means in said carburetor linkage for permitting free movement of the carburetor linkage by said auxiliary actuating means without affecting said accelerator switch.

12. In a motor vehicle, according to claim 11, in which said carburetor linkage means includes a pair of levers having a common pivot and a slot and pin connection, one of said levers being associated with the throttle of the carburetor and the other lever operatively connected to the accelerator.

JOSEPH WEISS.
ABRAHAM WEISS.

References Cited in the file of this patent
UNITED STATES PATENTS

| Number | Name | Date |
|---|---|---|
| 2,028,491 | Barrett | Jan. 21, 1936 |
| 2,038,289 | Herbster | Apr. 21, 1936 |
| 2,284,189 | Dick | May 26, 1942 |
| 2,287,301 | Freeman | June 23, 1942 |
| 2,287,562 | Pennington | June 23, 1942 |
| 2,297,076 | Sacks et al. | Sept. 29, 1942 |
| 2,308,822 | Murphy | Jan. 19, 1943 |
| 2,313,430 | Goepfrich | Mar. 9, 1943 |
| 2,334,611 | Darling | Nov. 16, 1943 |
| 2,414,409 | Goepfrich | Jan. 14, 1947 |
| 2,489,929 | Raybould | Nov. 29, 1949 |
| 2,507,140 | Bule | May 9, 1950 |
| 2,522,835 | Mayrath | Sept. 19, 1950 |
| 2,630,196 | Weiss et al. | Mar. 3, 1953 |